(12) United States Patent
Yoshida

(10) Patent No.: US 9,891,118 B2
(45) Date of Patent: Feb. 13, 2018

(54) TEMPERATURE SENSOR

(71) Applicant: DENSO CORPORATION, Kariya, Aichi-pref. (JP)

(72) Inventor: Kouichi Yoshida, Toyoake (JP)

(73) Assignee: DENSO CORPORATION, Kariya (JP)

( * ) Notice: Subject to any disclaimer, the term of this patent is extended or adjusted under 35 U.S.C. 154(b) by 244 days.

(21) Appl. No.: 14/832,135

(22) Filed: Aug. 21, 2015

(65) Prior Publication Data

US 2016/0054182 A1    Feb. 25, 2016

(30) Foreign Application Priority Data

Aug. 22, 2014  (JP) .................................. 2014-169716
Apr. 28, 2015  (JP) .................................. 2015-091919

(51) Int. Cl.
*G01K 7/00* (2006.01)
*G01K 13/02* (2006.01)
*G01K 7/22* (2006.01)
*G01K 1/08* (2006.01)

(52) U.S. Cl.
CPC .............. *G01K 13/02* (2013.01); *G01K 1/08* (2013.01); *G01K 7/22* (2013.01); *G01K 2013/024* (2013.01); *G01K 2205/04* (2013.01)

(58) Field of Classification Search
None
See application file for complete search history.

(56) References Cited

U.S. PATENT DOCUMENTS

| 2008/0219321 A1* | 9/2008 | Charlety | G01K 5/68 374/207 |
| 2010/0195698 A1* | 8/2010 | Hori | G01K 1/20 374/148 |
| 2012/0020385 A1* | 1/2012 | Matsuo | G01K 1/08 374/158 |

FOREIGN PATENT DOCUMENTS

| JP | 5-79922 | 3/1993 |
| JP | 2002-350239 | 12/2002 |
| JP | 2008-286790 | 11/2008 |

* cited by examiner

*Primary Examiner* — Erica Lin
(74) *Attorney, Agent, or Firm* — Nixon & Vanderhye P.C.

(57) ABSTRACT

A temperature sensor includes a metal tube containing thermo-sensitive element and filled with an insulating filling material, and a housing to which the metal tube is fixed. The metal tube includes a small-diameter part and a large-diameter part. The distal end of the small-diameter part is located beyond a virtual line. The virtual line passes a center of a maximum virtual circle which is an inscribed circle that contacts at least three points on an inner surface of the pipe in a cross-section perpendicular to an axial direction of the pipe, and is perpendicular to a center axis line of the metal tube. The whole of the small-diameter part and the part of the large-diameter part filled with the filling material are located within a center virtual circle which is coaxial with the maximum virtual circle and has an inner diameter of ⅔ of that of the maximum virtual circle.

9 Claims, 7 Drawing Sheets

TEMPERATURE SENSOR

This application claims priority to Japanese Patent Application No. 2014-169716 filed on Aug. 22, 2014 and No. 2015-91919 filed on Apr. 28, 2015, the entire contents of which are hereby incorporated by reference.

BACKGROUND OF THE INVENTION

1. Field of the Invention

The present invention relates to a temperature sensor including a thermo-sensitive element.

2. Description of Related Art

It is known to dispose a temperature sensing part of a thermo-sensitive element protected by a metal tube of a temperature sensor within a pipe for the purpose of measuring the temperature of a fluid flowing through the pipe, for example, the temperature of an exhaust gas flowing through an exhaust pipe of an internal combustion engine. The metal tube is fitted to a housing to be fixed to the pipe. The temperatures of a part of the metal tube and the thermo-sensitive element located in the vicinity of the axial center of the pipe become nearly equal to the temperature of the fluid flowing along the vicinity of the axial center of the pipe. On the other hand, the heat of another part of the metal tube located in the vicinity of radially peripheral part of the pipe is dissipated to the housing disposed outside the pipe. If this heat dissipation amount becomes large, the measured value of the temperature sensor may become unreliable.

For example, the temperature sensor described in Japanese Patent Application Laid-open No. 2008-286790 includes a thermo-sensitive element to be disposed within a flow passage, signal wires connected to the thermo-sensitive element at distal ends thereof and connected to lead wires for connection with an external circuit at the proximal ends thereof, a sheath member holding therein the signal wires, and a holding member holding the outer periphery of the sheath member. The extension length of the temperature sensor, or the length between the inner periphery of the flow passage and the center of the thermo-sensitive element is set larger than or equal to 50 mm, so that the temperature of a fluid flowing through the flow passage can be measured at a high degree of accuracy.

However, since the temperature sensor is assumed to be used for pipes whose inner diameters are larger than or equal to 100 mm, it cannot be used for pipes whose inner diameters are smaller than 100 mm. Generally, intake pipes, exhaust pipes, and pipes for an EGR (Exhaust Gas Recirculation) systems are smaller than 100 mm in inner diameter. Accordingly, to use such a temperature sensor for these small-diameter pipes, it is necessary to contrive means for greatly reducing heat dissipation from the metal tube to the housing.

SUMMARY

An exemplary embodiment provides a temperature sensor including:

a thermo-sensitive element;

a metal tube containing therein the thermo-sensitive element, a distal end thereof at which the thermo-sensitive element is disposed being closed;

an insulating filling material filled in the metal tube; and a housing to which a proximal end portion of the metal tube is fixed, the housing being fitted to a pipe through which a measurement gas flows, at least a distal end portion of the metal tube being disposed inside the pipe, wherein the metal tube includes a small-diameter part located on a distal end side thereof, and a large-diameter part located on a proximal end side of the small-diameter part and having an outer diameter larger than an outer diameter of the small-diameter part, the outer diameter of the small-diameter part is in a range between 1 mm and 3 mm, a ratio of a length of the small-diameter part to the outer diameter of the small-diameter part being in a range between 8 and 15, the filling material is filled continuously in a whole of the small-diameter part and a part of the large-diameter part, a distal end of the small-diameter part is located beyond a virtual line when viewed from the large-diameter part, the virtual line passing a center of a maximum virtual circle which is an inscribed circle that contacts at least three points on an inner surface of the pipe in a cross-section perpendicular to an axial direction of the pipe, and being perpendicular to a center axis line of the metal tube, and the whole of the small-diameter part and the part of the large-diameter part filled with the filling material are located within a center virtual circle which is coaxial with the maximum virtual circle and has an inner diameter of ⅔ of a diameter of the maximum virtual circle.

According to the exemplary embodiment, there is provided a temperature sensor capable of measuring a temperature of a gas flowing through a small-diameter pipe with a high degree of accuracy.

Other advantages and features of the invention will become apparent from the following description including the drawings and claims.

PREFERRED EMBODIMENTS OF THE INVENTION

Figure 1:
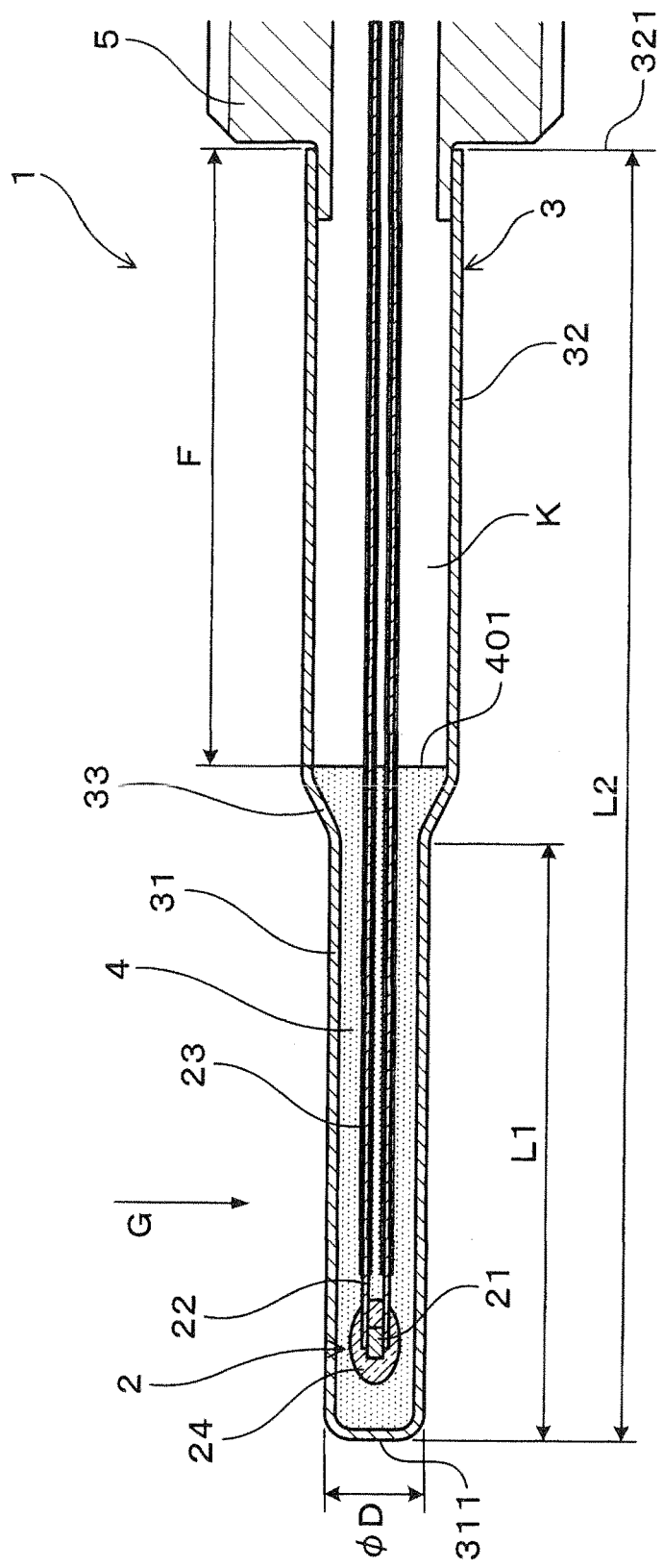
FIG. 1 is a partial cross-sectional view of a temperature sensor according to an embodiment of the invention.

A temperature sensor 1 according to an embodiment of the invention is described with reference to FIGS. 1 to 7. The temperature sensor 1 is mounted in an exhaust or intake pipe 6 of an internal combustion engine of an automobile provided with an EGR system for measuring the temperature of the exhaust gas or recirculated exhaust gas flowing through the pipe 6. As shown in FIG. 1, the temperature sensor 1 includes a thermo-sensitive element 2, a metal tube 3, a filling material 4, and a housing 5. At least a part of the metal tube 3 is located within the pipe 6. The thermo-sensitive element 2 has an electrical resistance which changes depending on the ambient temperature. The metal tube 3, which holds therein the thermo-sensitive element 2, is closed on the distal end side at which a heat-sensing part 21 of the thermo-sensitive element 2 is disposed. The filling material 4, which has good insulativity and heat conductivity, is filled in the metal tube 3 so as to surround the thermo-sensitive element 2. The housing 5 fixes the proximal end portion of the metal tube 3, and is fitted to the pipe 6 through which a measurement gas G flows. The metal tube 3 includes a small-diameter part 31 at the distal end side, and a large-diameter part 32 located at the side of the proximal end of the small-diameter part 31 and having a diameter larger than that of the small-diameter part 31.

Figure 2:
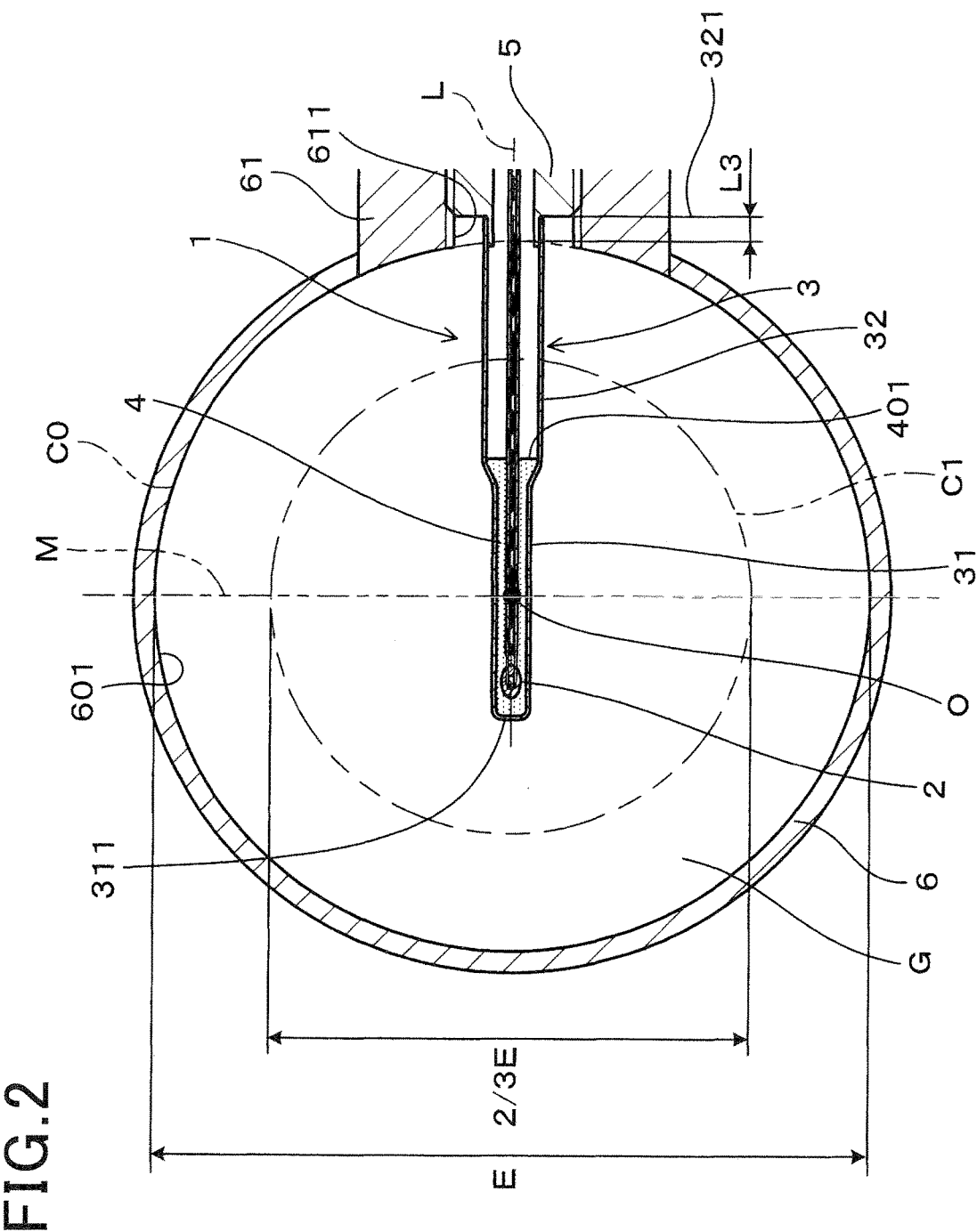
FIG. 2 is a partial cross-sectional view of the temperature sensor in the direction perpendicular to the axial direction of a pipe in which the temperature sensor is mounted.
Figure 3:
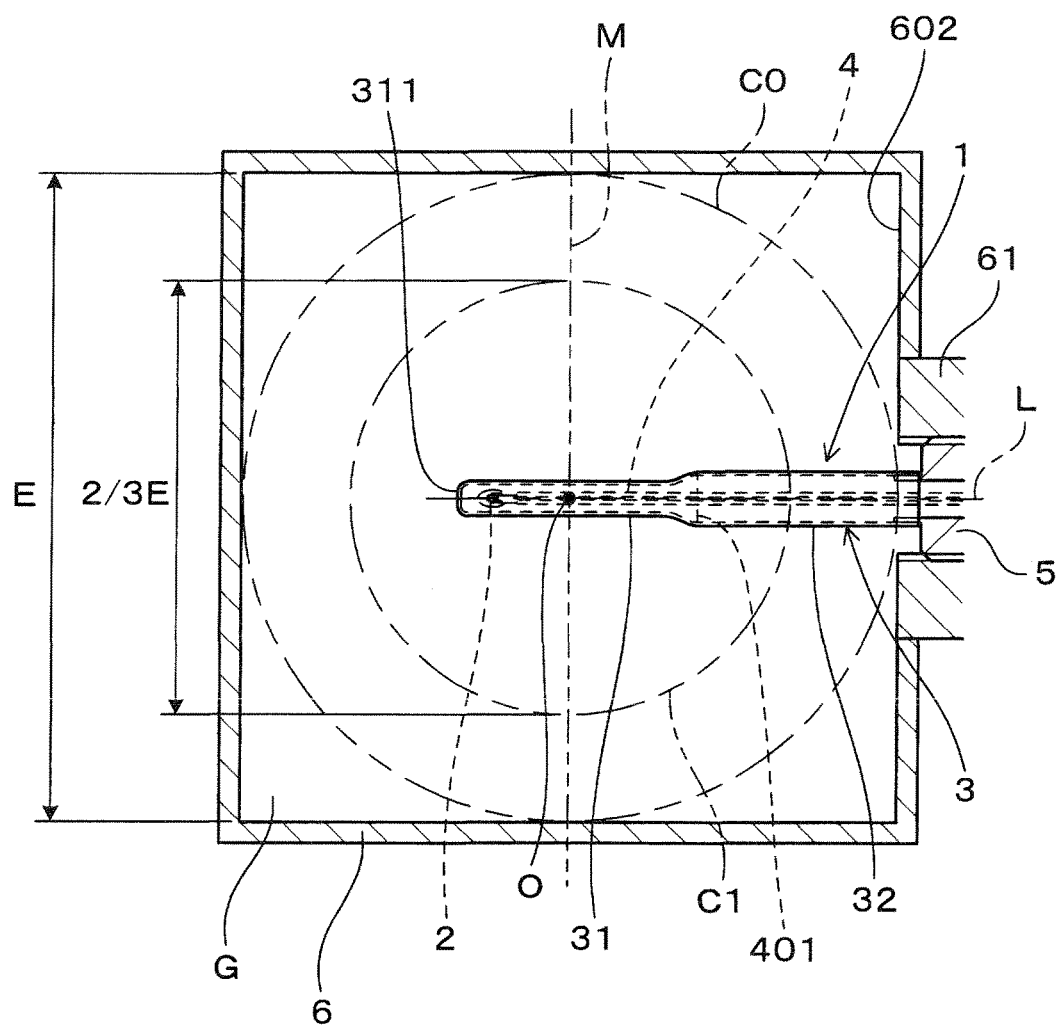
FIG. 3 is a partial cross-sectional view of the temperature sensor in the direction perpendicular to the axial direction of another pipe in which the temperature sensor is mounted.
Figure 5:
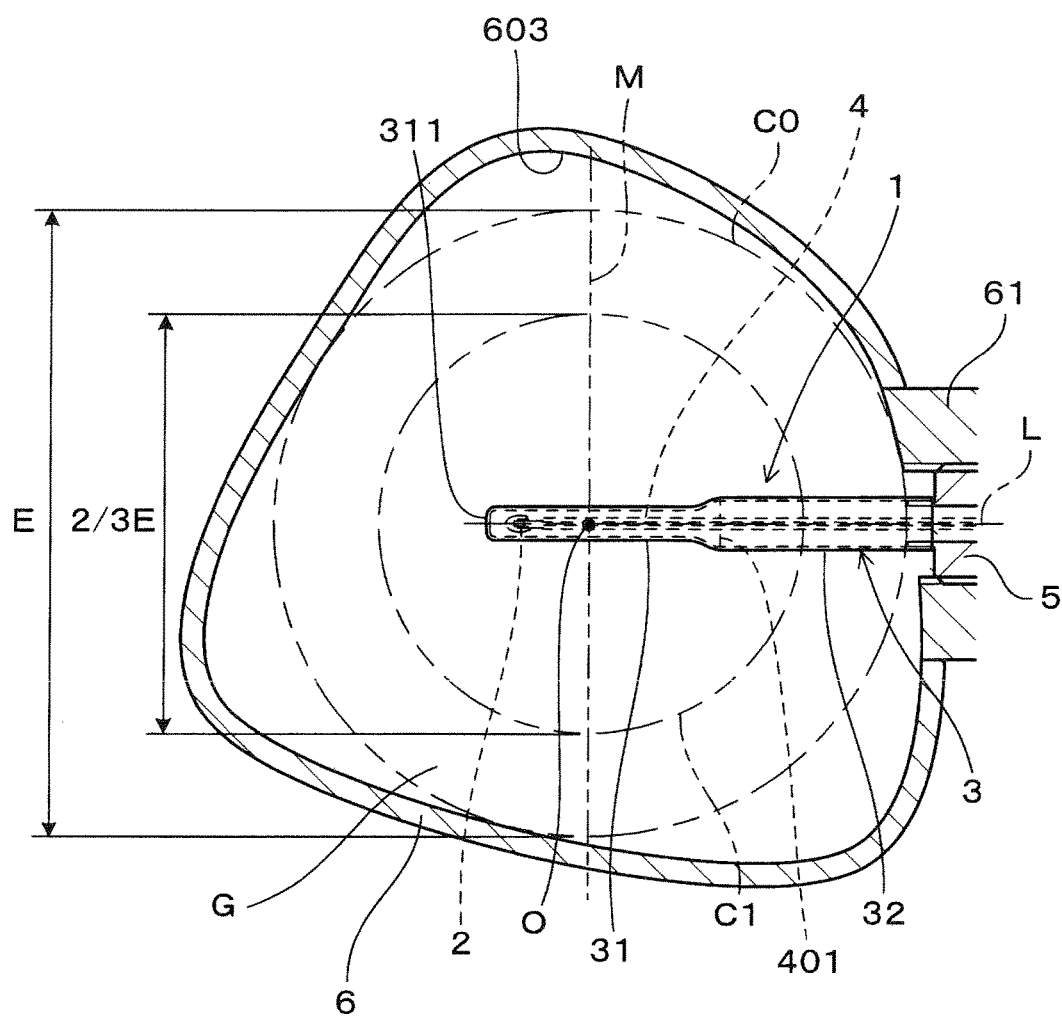
FIG. 5 is a partial cross-sectional view of the temperature sensor in the direction perpendicular to the axial direction of another pipe in which the temperature sensor is mounted.

The outer diameter D of the small-diameter part 31 is in the range between 1 mm and 3 mm, and the ratio L1/D of the length L1 of the small-diameter part 31 to the outer diameter D of the small-diameter part 31 is in the range between 8 and 15. The filling material 4 is filled continuously in the whole of the small-diameter part 31 and part of the large-diameter part 32. As shown in FIG. 2, the distal end 311 of the small-diameter part 31 is located beyond a virtual line M when viewed from the large-diameter part 32, the virtual line M passing the center O of a maximum virtual circle C0 which is the inscribed circle that contacts at least three points on an inner surface of the pipe 6 (e.g., all points on an inner surface 601 in the case of the pipe 6 having a circular cross-sectional shape as shown in FIG. 2, four points on an inner surface 602 in the case of the pipe 6 having a square cross-sectional shape as shown in FIG. 3, or three points on an inner surface 603 in the case of the pipe 6 having an irregular cross-sectional shape as shown in FIG. 5), and being perpendicular to the center axis line L of the metal tube 3. The temperature sensor 1 is used in a state where the whole of the small-diameter part 31 and a part (between the distal end 311 of the small-diameter part 31 and the end surface 401 of the filling material 4) of the large-diameter part 32, the part being filled with the filling material 4, are located within a center virtual circle C1 which is coaxial with the maximum virtual circle C0 and has an inner diameter of ⅔E, E being the inner diameter of the maximum virtual circle C0. FIG. 2 shows the cross-section of the temperature sensor 1 in the direction perpendicular to the axial direction H of the pipe 6.

The inner diameter of the pipe 6 is smaller than 100 mm. The pipe 6 has a circular cross section. The center axis line of the metal tube 3 (and the temperature sensor 1) extends in the radial direction of the pipe 6, and in the direction perpendicular to the axial direction H of the pipe 6. Preferably, the inner diameter of the pipe 6 is larger than or equal to 40 mm. The diameter of the maximum virtual circle C0 can be in the range between 40 mm and 100 mm for various cross-sectional shapes of the pipe 6.

Figure 4:
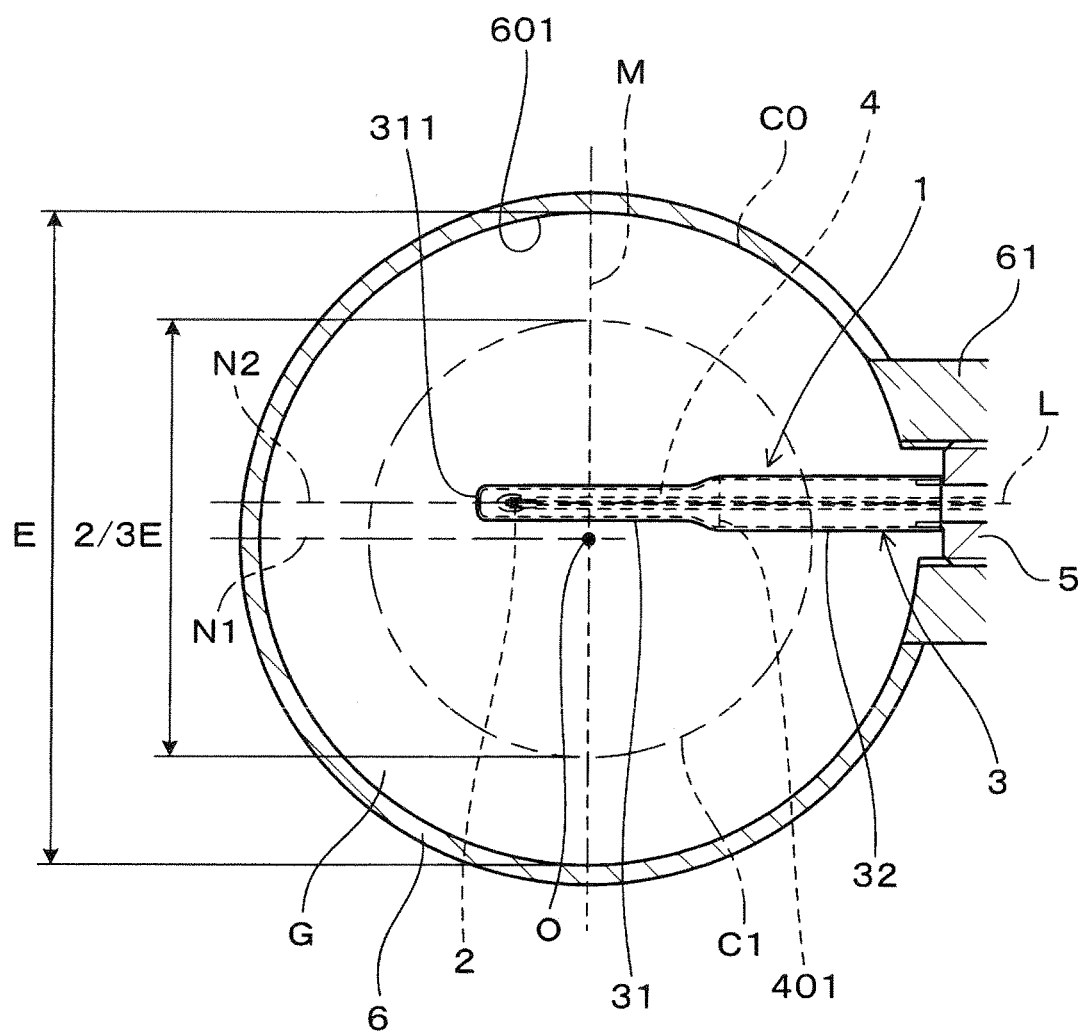
FIG. 4 is a partial cross-sectional view of the temperature sensor in the direction perpendicular to the axial direction of another pipe in which the temperature sensor is mounted.

As shown in FIG. 3, the cross-sectional shape of the pipe 6 may be square. In this case, the temperature sensor 1 is fitted to one flat side portion of the pipe 6. In this case, the maximum virtual circle C0 contacts the inner surface 602 of each flat side portion of the pipe 6. When the cross-sectional shape of the pipe 6 is circular as shown in FIG. 4, the temperature sensor 1 may be disposed in parallel to a virtual straight line N2 which is offset in parallel to a virtual straight line N1 passing through the center of the cross-section of the pipe 6. As shown in FIG. 5, the pipe 6 may have an irregular shape formed by straight lines and curved lines as shown in FIG. 5. In this case, the maximum virtual circle C0 contacts the inner surface 603 of the pipe 6 having the irregular shape. Also in the case of FIG. 4 or 5, the virtual line M passes through the center O of the maximum virtual circle C0 and orthogonally intersects the center axis line L of the metal tube 3.

Figure 6:
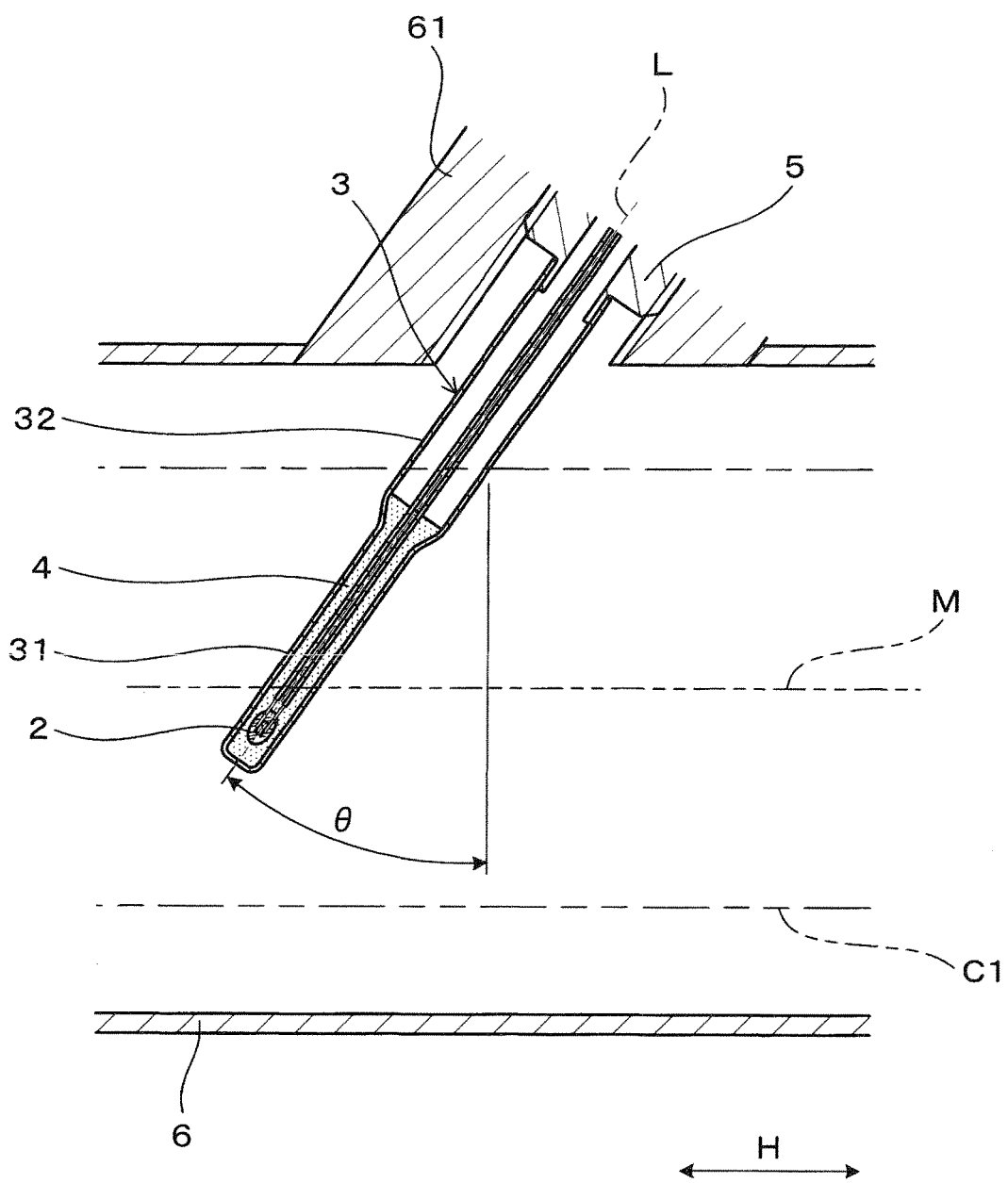
FIG. 6 is a partial cross-sectional view of the temperature sensor in the axial direction of another pipe in which the temperature sensor is mounted with a slant.

As shown in FIG. 6, the center axis line L of the metal tube 3 may be slanted upstream or downstream of the flow of the measurement gas G within 45° from the direction perpendicular to the axial direction H of the pipe 6. In this case, the housing 5 is fitted to the pipe 6 such that the center axis L of the metal tube 3 slants from the axial direction H of the pipe 6. Also in this case, the whole of the small-diameter part 31 and the part of the large-diameter part 32 filled with the filling material 4 are located within the center virtual circle C1. If the center axis line L of the metal tube 3 is slanted upstream or downstream of the flow of the measurement gas G over 45 degrees from the direction perpendicular to the axial direction H of the pipe 6, the metal tube 3 is likely to vibrate due to vibration of the pipe 6.

As shown in FIG. 2, the pipe 6 is provided with a fitting part 61 for fitting the housing 5 to the pipe 6. The fitting part 61 is formed with an insertion hole 611 through which the metal tube 2 of the temperature sensor 1 is inserted. The housing 5 is fitted to the fitting part 61 with the metal tube 2 being inserted into the insertion hole 611. The housing 5 is screwed to a threaded portion formed in the insertion hole 611 at its threaded portion. The large-diameter part 32 of the metal tube 3 may be formed in a shape in which its diameter increases toward its proximal end portion in two or more steps.

Figure 7:
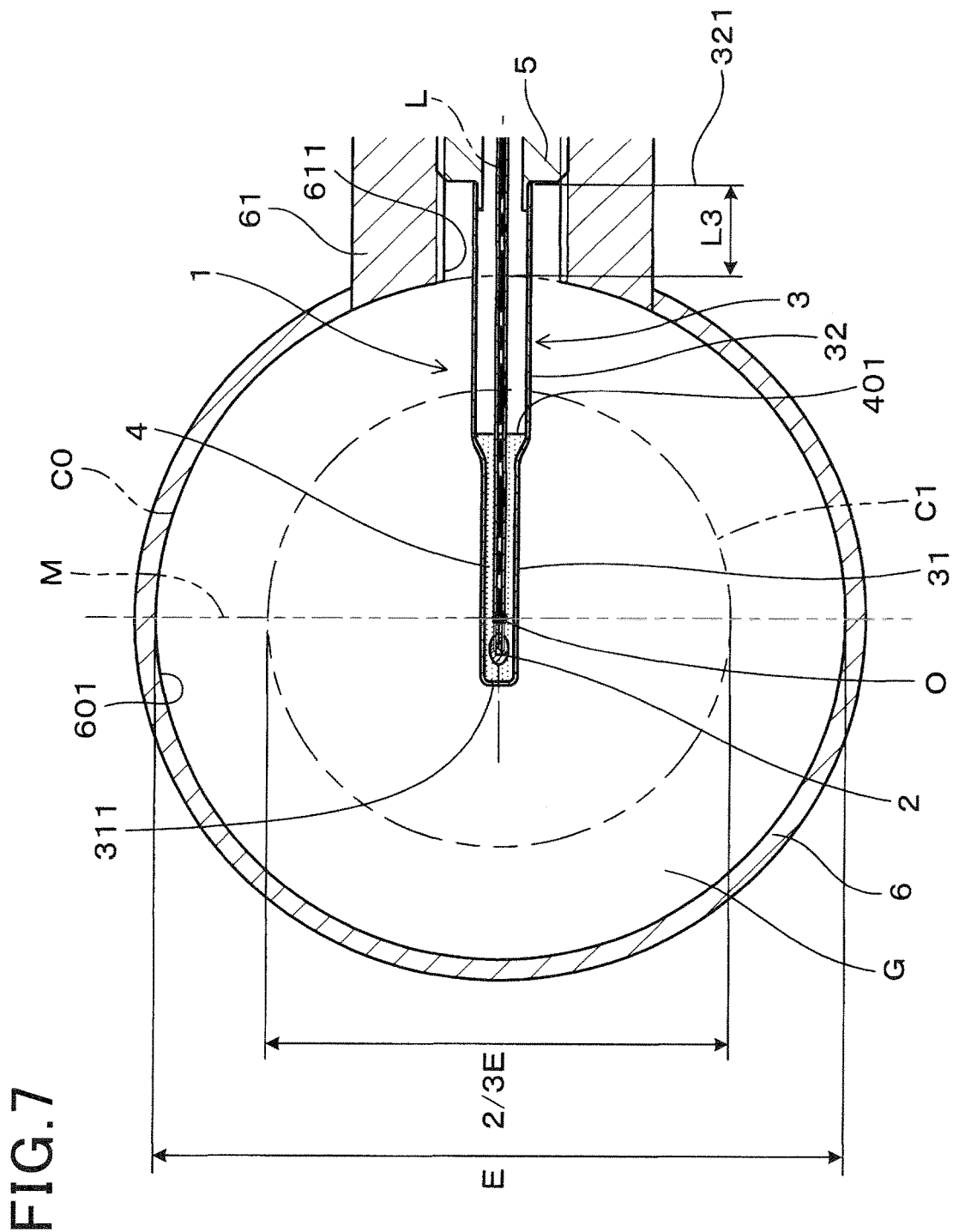
FIG. 7 is a partial cross-sectional view of the temperature sensor in the axial direction of a pipe in which the temperature sensor is mounted.

As shown in FIGS. 2 and 7, the proximal end portion of the metal tube 3 of the temperature sensor 1 may be located more outside than the inner surface 601, 602 or 603 of the pipe 6. The length L3 from the proximal end 321 of the metal tube 3 to the inner surface 601, 602 or 603 of the pipe 6 may be smaller than or equal to 0.5 times the entire length L2 of the metal tube 3. The length L3 may be set to an appropriate value depending on the inner diameter of the pipe 6 and the entire length L2 of the metal tube 3. The position of the metal tube 3 in the radial direction of the pipe 6 can be adjusted by adjusting the position of the housing 5 with respect to the axial direction of the insertion hole 611.

The filling material 4 is made of resin such as polyimide or silicone containing ceramics such as AlN (aluminum nitride), $Al_2O_3$ (aluminum oxide), SiC (silicon carbide) or SiN (silicon nitride) as an aggregate. Using the filling material 4 makes it possible to hold a pair of electrode wires 22 within the small-diameter part 31 of the metal tube 3 to protect the electrode wires 22 from vibration. Since the aggregate of the filling material 4 is made of ceramics, the heat transfer from the metal tube 3 to the thermo-sensitive element 2 can be promoted. Further, this ceramics ensures an insulating resistance between the electrode wires 22. There is formed a space K inside the large-diameter part 32 of the metal tube 3. Between the small-diameter part 31 and the large-diameter part 32, there is formed a tapered step portion 33. The filling material 4 is filled in the whole inside of the small-diameter part 31 and the step portion 33, and also part of the inside of the large-diameter part 32.

Since the diameter of the large-diameter part 32 is larger than that of the small-diameter part 31, the fixing strength between the proximal end portion of the metal tube 3 and the housing 5 can be made high. Particularly, in the case where the temperature sensor 1 is used for an automobile internal combustion engine whose vibration level is very high, since the metal tube 3 is hard to move freely, the metal tube 3 can be prevented from being damaged. Further, since the outer diameter D of the small-diameter part 31 is in the range between 1 mm and 3 mm, the metal tube 3 is also hard to move freely, the metal tube 3 can be prevented from being damaged. In addition, since the thermo-sensitive element 2 disposed inside the small-diameter part 31 can easily follow the temperature change of the measurement gas G, the responsibility of the temperature sensor 1 can be made high. If the outer diameter D of the small-diameter part 31 is smaller than 1 mm, the strength of the small-diameter part 31 may be insufficient. On the other hand, if the outer diameter D of the small-diameter part 31 is larger than 3 mm, there is a concern that the thermo-sensitive element 2 cannot easily follow the temperature change of the measurement gas G.

The ratio L1/D of the length L1 of the small-diameter part 31 to the outer diameter D of the small-diameter part 31 is in the range between 8 and 15. This makes it possible to maintain each of the measurement accuracy and the strength at a sufficiently high level. If the ratio L1/D is smaller than 8, there is a concern that the heat dissipation from the metal tube 3 to the housing 5 may become excessive, causing the measurement accuracy of the temperature sensor 1 to be lowered. On the other hand, if the ratio L1/D is smaller than 15, there is a concern that the strength of the metal tube 3 may become insufficient.

The entire length L2 of the metal tube 3 is in the range between 20 mm and 50 mm. The entire length L2 of the metal tube 3 is determined depending on the inner diameter of the pipe 6. The large-diameter part 32 of the metal tube 3 may be formed in a shape in which its diameter increases toward its proximal end portion in two steps. The distance F from the proximal end 321 of the metal tube 3 to the end surface 401 of the filling material 4 is in the range between 5 mm and 40 mm. If the distance F is smaller than 5 mm, the heat dissipation from the metal tube 3 to the housing 5 becomes excessive. On the other hand, if the distance F is larger than 40 mm, the strength of the sheath wires 23 connected to the electrode wires 22 may become insufficient.

The thermo-sensitive element 2 is formed of a thermistor whose electrical resistance changes in accordance with the ambient temperature. The electrode wires 22 are drawn from the heat-sensing part 21 of the thermo-sensitive element 2 to be connected to the sheath wires 23 disposed within an insulating tube. The sheath wires 23 are drawn into the housing 5. In this embodiment, the temperature sensor 1 is used for measuring the temperature of the measurement gas G, which is lower than or equal to 500° C. By using a thermistor as the thermo-sensitive element 2 and a simple electrical circuit, the sensitivity of the temperature sensor 1 to the temperature can be increased. The heat-sensing part 21 of the thermo-sensitive element 2 is sealed by an electrical insulating glass member 24, so that the thermistor subjected to high temperature can be protected from thermal deterioration.

The shape of the metal tube 3 and the position of the metal tube 3 relative to the pipe 6 are well designed so that the temperature measuring accuracy is kept high even when the inner diameter of the pipe 6 is small by suppressing the heat dissipation from the metal tube 3 to the housing 5. Specifically, the outer diameter D of the small-diameter part 31 is in the range between 1 mm and 3 mm, and the ratio L1/D of the length L1 of the small-diameter part 31 to the outer diameter D of the small-diameter part 31 is in the range between 8 and 15. The filling material 4 is filled continuously in the whole of the small-diameter part 31 and a part of the large-diameter part 32. The distal end 311 of the small-diameter part 31 is located beyond the virtual line M when viewed from the side of the large-diameter part 32, and the whole of the small-diameter part 31 and the part of the large-diameter part 32 filled with the filling material 4 are located within the center virtual circle C1 which is coaxial with the maximum virtual circle C0 and has the inner diameter of $\frac{2}{3}$E.

Accordingly, the whole of the part filled with the filling material 4 of the metal tube 3, which has good thermal conductivity, is located within the center virtual circle C1 in a center area of the pipe 6. A part as wide as possible of the metal tube 3 is located within the center virtual circle C1. The temperature distribution of the pipe 6 is sufficiently uniform within this center virtual circle C1. Accordingly, since the thermal conductivity in the vicinity of the thermo-sensitive element 2 is high, and the temperature of the heat-sensing part 21 of the thermo-sensitive element 2 can be caused to quickly reach the temperature of the measurement gas G in the pipe 6. The other part not filled with the filling material 4 of the metal tube 3, which has bad conductivity, is located outside the center virtual circle C1 in the center area of the pipe 6. The temperature in the pipe 6 tends to be low at the outside of the center virtual circle C1. Accordingly, the heat dissipation from the metal tube 3 to the housing 5 can be suppressed by locating the part which has bad conductivity at the place which is low in the temperature in the pipe 6, to thereby reduce error of measurement of the temperature of the measurement gas G by the temperature sensor. According to this embodiment, it is possible to reduce the error even when the inner diameter of the pipe 6 is smaller than 100 mm.

To confirm differences of the effect depending on the positional relationship between the pipe 6 and the temperature sensor 1, various confirmation tests were performed. In these confirmation tests described below, the position at which the distal end 311 of the small-diameter part 31 of the metal tube 3 is located, and the state that the whole of the part filled with the filling material 4 of the meta tube 3 is located within the center virtual circle C1 are the same as those in the first embodiment.

Confirmation Test 1

In this test, an appropriate range of the ratio L1/D (see FIG. 1) of the length L1 (see FIG. 1) to the outer diameter D of the small-diameter part 31 was confirmed. Specifically, a temperature measurement test and a vibration test were performed. In the temperature measurement test, the difference between the actual temperature TO (true temperature) and the temperature T1 measured by the temperature sensor 1 was measured while changing the ratio L1/D in the range between 5 and 20. In the vibration test, it was checked whether the vibration of the temperature sensor 1 was within an allowable level when the pipe 6 was vibrated while the ratio L1/D was changed in the range between 5 and 20. In the vibration test, the pipe 6 was vibrated at 40 G (392 m/s$^2$). Table 1 shows the results of confirmation test 1.

TABLE 1

| L1/D | T/T0 | VIBRATION |
|---|---|---|
| 5 | 1.2 | ○ |
| 7 | 1.1 | ○ |
| 8 | 1 | ○ |
| 10 | 1 | ○ |
| 12 | 1 | ○ |
| 15 | 1 | ○ |
| 17 | 1 | X |
| 20 | 1 | X |

As shown in this table, when the ratio L1/D is 5 or 7, the value T/T1 is larger than 1, which means some error occurs in the temperature measurement. When the ratio L1/D is 17 or 20, the evaluation of the result of the vibration test is "x", which means that the vibration level of the metal tube 3 exceeds the allowable level. These results show that, when the ratio L1/D is 8, 10, 12, or 15, the value T/T1 is equal to 1 meaning that the temperature measurement error is very small, and the evaluation of the result of the vibration test is "◯" meaning that the vibration level of the metal tube 3 is within the allowable level. Accordingly, it can be concluded that when the ratio L1/D is set in the range between 8 and 15, the temperature sensor 1 exhibits excellent performance in both the measurement accuracy and strength.

Confirmation Test 2

In this test, an appropriate range of the distance F (see FIG. 1) from the proximal end 321 of the metal tube 3 to the end surface 401 of the filling material 4 was confirmed. Specifically, the value of T/T0 was measured while changing the distance F in the range between 0 mm and 7 mm. Table 2 shows the results of confirmation test 2.

TABLE 2

| F (mm) | T/T0 |
|---|---|
| 0 | 0.95 |
| 3 | 0.98 |
| 5 | 1 |
| 7 | 1 |

As shown in this table, when the distance F is 0 mm or 3 mm, the value T/T0 is smaller than 1, which means that some error occurs in the temperature measurement. On the other hand, when the distance F is 5 mm or 7 mm, the value T/T1 is equal to 1, which means that there occurs almost no error in the temperature measurement. Accordingly, it can be concluded that when the ratio L1/D is set larger than or equal to 5 mm, the temperature sensor 1 exhibits excellent performance in the temperature measurement accuracy.

Confirmation Test 3

In this test, there was confirmed the effect obtained by locating the distal end 311 of the small-diameter part 31 of the metal tube 3 beyond the virtual line M when viewed from the side of the large-diameter part 32, and locating the whole of the small-diameter part 31 and the part of the large-diameter part 32 filled with the filling material 4 within the center virtual circle C1. Specifically, the value of T/TO was measured for each of the case where the distal end 311 of the small-diameter part 31 of the metal tube 3 was beyond the virtual line M when viewed from the side of the large-diameter part 32, and the case where it was in front of the virtual line M when viewed from the side of the large-diameter part 32.

More specifically, the value of T/TO was measured for each of the case where the distal end 311 was located at the center O of the maximum virtual circle CO, the case where the distal end 311 was located at a distance of ½E, 1/2.5E, ⅓E and ⅕E, respectively, beyond the center O of the maximum virtual circle CO, and the case where the distal end 311 was located at a distance of −⅕E, −⅓E, ½E and −1/2.5E, respectively, in front of the center O of the maximum virtual circle CO. Incidentally, in the case where the distal end 311 was located at a distance of ⅓E or ⅕E beyond the center O of the maximum virtual circle CO, the whole of the small-diameter part 31 and the part of the large-diameter part 32 filled with the filling material 4 are located within the center virtual circle C1. Table 3 shows the results of confirmation test 3.

TABLE 3

| DISTAL END POSITION | T/T0 |
|---|---|
| 1/2E | 0.8 |
| 1/2.5E | 0.9 |
| 1/3E | 1 |
| 1/5E | 1 |
| 0 | 0.99 |
| −1/5E | 0.98 |
| −1/3E | 0.9 |
| −1/2.5E | 0.85 |
| −1/2E | 0.8 |

As shown in this table, when the position of the distal end 311 is at a distance of ½E or 1/2.5E beyond the center O of the maximum virtual circle CO, some error occurs in the temperature measurement by the temperature sensor 1. Also, when the position of the distal end 311 is at a distance of −⅕E, −⅓E, −1/2.5E or −½E in front of the center O of the maximum virtual circle CO, some error occurs in the temperature measurement by the temperature sensor 1. On the other hand, when the position of the distal end 311 is at a distance of ⅓E or ⅕E beyond the center O of the maximum virtual circle CO, there occur almost no errors in the temperature measurement by the temperature sensor 1. Accordingly, it can be concluded that when the whole of the small-diameter part 31 and the part of the large-diameter part 32 filled with the filling material 4 are located within the center virtual circle C1 which is coaxial with the maximum virtual circle CO and has an inner diameter ⅔E, the temperature sensor 1 exhibits excellent performance in the temperature measurement accuracy.

Confirmation Test 4

In this test, there was confirmed a range of the angle by which the center axis line L of the metal tube 3 can be slanted to the axial direction H of the pipe 5. Specifically, a test for measuring the value of T/TO and a vibration test were performed while changing the slant angle θ (see FIG. 6) in the range between 30° and 150°. When the slant angle θ is 90°, the center axis line L is perpendicular to the axial direction H of the pipe 6. When the slant angle θ is smaller than 90°, the center axis line L slants toward the upstream side of the flow of the measurement gas G with respect to the axial direction H of the pipe 6. When the slant angle θ is larger than 90°, the center axis line L slants toward the downstream side of the flow of the measurement gas G with respect to the axial direction H of the pipe 6. Table 4 shows the results of confirmation test 4.

TABLE 4

| SLANT ANGLE θ (°) | T/T0 | VIBRATION |
|---|---|---|
| 30 | 1 | X |
| 45 | 1 | ◯ |
| 60 | 1 | ◯ |
| 90 | 1 | ◯ |
| 120 | 1 | ◯ |
| 135 | 1 | ◯ |
| 150 | 1 | X |

As shown in this table, when the slant angle θ is 30° or 150°, the evaluation of the result of the vibration test is "x", which means that the vibration level of the metal tube 3 exceeds the allowable level. On the other hand, when the slant angle θ is in the range between 45° and 135°, the evaluation of the result of the vibration test is "◯", which means that the vibration level of the metal tube 3 is within the allowable level. Meanwhile, when the slant angle θ is in the range between 30° and 150°, there occurs little error in the temperature measurement by the temperature sensor 1. Accordingly, it can be concluded that when the slant angle θ is set within the range between 45° and 135° with respect to the axial direction H of the pipe 6, the temperature sensor 1 exhibits excellent resistivity to vibration.

Confirmation Test 5

In this test, an appropriate range of the length L3 (see FIG. 7) from the proximal end 321 of the metal tube 3 to the inner surface 601, 602 or 603 of the pipe 6 was confirmed. Specifically, a vibration test was performed while changing the length L3 in the range between 0 times and 1 times the entire length L2 of the metal tube 3. Here, the case where the length L3 is 0 times the entire length L2 of the metal tube 3 is the case where the proximal end 321 of the metal tube 3 is at the position of the inner surface 601, 602 or 603 of the pipe 6. The case where the length L3 is 1 times the entire length L2 of the metal tube 3 is the case where the distal end 311 of the metal tube 3 is at the position of the inner surface 601, 602 or 603 of the pipe 6. Table 5 shows the results of confirmation test 5.

TABLE 5

| L3 (mm) | VIBRATION |
|---|---|
| 0 | ◯ |
| 0.3 | ◯ |
| 0.5 | ◯ |
| 0.7 | X |
| 1 | X |

As shown in this table, when the length L3 is 0.7 or 1 times the entire length L2, the evaluation of the result of the vibration test is "x", which means that the vibration level of the metal tube 3 exceeds the allowable level. On the other hand, when the length L3 is 0.3 or 0.5 times the entire length L2, the evaluation of the result of the vibration test is "◯", which means that the vibration level of the metal tube 3 is within the allowable level. Accordingly, it can be concluded that when the length L3 from the proximal end 321 of the metal tube 3 to the inner surface 601, 602 or 603 of the pipe 6 is set smaller than or equal to 0.5 times the entire length L2 of the metal tube 3, the temperature sensor 1 exhibits excellent resistivity to vibration.

The above explained preferred embodiments are exemplary of the invention of the present application which is described solely by the claims appended below. It should be understood that modifications of the preferred embodiments may be made as would occur to one of skill in the art.

What is claimed is:

1. A temperature sensor comprising:
a thermo-sensitive element;
a metal tube containing therein the thermo-sensitive element, a distal end thereof at which the thermo-sensitive element is disposed being closed;
an insulating filling material filled in the metal tube; and
a housing to which a proximal end portion of the metal tube is fixed, the housing being fitted to a pipe through which a measurement gas flows,
at least a distal end portion of the metal tube being disposed inside the pipe, wherein the metal tube includes a small-diameter part located on a distal end side thereof, and a large-diameter part located on a proximal end side of the small-diameter part and having an outer diameter larger than an outer diameter of the small-diameter part, the outer diameter of the small-diameter part is in a range between 1 mm and 3 mm, a ratio of a length of the small-diameter part to the outer diameter of the small-diameter part being in a range between 8 and 15, the filling material is filled continuously in a whole of the small-diameter part and a part of the large-diameter part, a distal end of the small-diameter part is located beyond a virtual line when viewed from the large-diameter part, the virtual line passing a center of a maximum virtual circle which is an inscribed circle that contacts at least three points on an inner surface of the pipe in a cross-section perpendicular to an axial direction of the pipe, and being perpendicular to a center axis line of the metal tube, and the whole of the small-diameter part and the part of the large-diameter part filled with the filling material are located within a center virtual circle which is coaxial with the maximum virtual circle and has an inner diameter of ⅔ of an inner diameter of the maximum virtual circle.

2. The temperature sensor according to claim 1, wherein an entire length of the metal tube is in a range between 20 mm and 50 mm.

3. The temperature sensor according to claim 1, wherein a distance from a proximal end of the metal tube to an end surface of the filling material is in a range between 5 mm and 40 mm.

4. The temperature sensor according to claim 1, wherein the thermo-sensitive element is formed of a thermistor.

5. The temperature sensor according to claim 4, wherein the thermistor is sealed by an insulating glass member.

6. The temperature sensor according to claim 1, wherein the filling material is made of polyimide or silicone, which contains, as a ceramic aggregate, one or more of aluminum nitride, aluminum oxide, silicon carbide and silicon nitride.

7. The temperature sensor according to claim 1, wherein a center axis line of the metal tube is perpendicular to the axial direction of the pipe.

8. The temperature sensor according to claim 1, wherein a center axis line of the metal tube is slanted toward upstream or downstream of flow of the measurement gas within 45° from a direction perpendicular to the axial direction of the pipe.

9. The temperature sensor according to claim 1, wherein the proximal end portion of the metal tube is located more outside than the inner surface of the pipe, and a length from a proximal end of the metal tube to the inner surface of the pipe is smaller than or equal to 0.5 times an entire length of the metal tube.

* * * * *